May 14, 1957     F. J. SWEENEY     2,791,863

FISHHOOK HOLDER

Filed Oct. 24, 1955

INVENTOR
FREDERICK J. SWEENEY
By Frederick C. Bromley
ATTY.

United States Patent Office 2,791,863
Patented May 14, 1957

2,791,863

FISHHOOK HOLDER

Frederick J. Sweeney, Toronto, Ontario, Canada

Application October 24, 1955, Serial No. 542,304

3 Claims. (Cl. 43—57.5)

This invention relates to a storage rack for snelled hooks and the like.

In particular it relates to storage rack or holding means for storing fish hooks having a leader and eye attached thereto.

Prior art devices of this kind suffer serious disadvantages, among which are metal parts which are originally plated, but wear and expose metals which rust, hinged devices wherein the hinges become clogged and rust or break, plastic casings which break readily and, most serious of all, containers which will sink and be lost if they fall out of a boat or fisherman's kit into the water.

It is an object of this invention to provide a fish hook storage device having no moving parts.

It is a further object to provide a device of the kind indicated which securely holds the snelled hooks and yet permits their ready removal from the stored position.

It is another object to provide a fish hook storage device which will accommodate a relatively large number of snelled hooks in a relatively small and conveniently shaped package.

Still another and important object is to provide a storage device for snelled hooks which will not sink in water, and one which is cheap to manufacture.

According to my invention I provide a rectilinear member comprised of light soft material such as soft wood. The two major faces of this member contain a plurality of grooves of sufficient width and depth to receive the bill of a fish hook or lure, and also to receive a part of the leader associated with said hook. One or both of the edges pierced by said grooves support hitching pins arranged to receive the eyes of the leaders associated with said fish hooks and/or lures.

This invention will now be more fully disclosed by the following description of an exemplary construction, the text being aided by reference to the accompanying drawings wherein.

Figure 2:
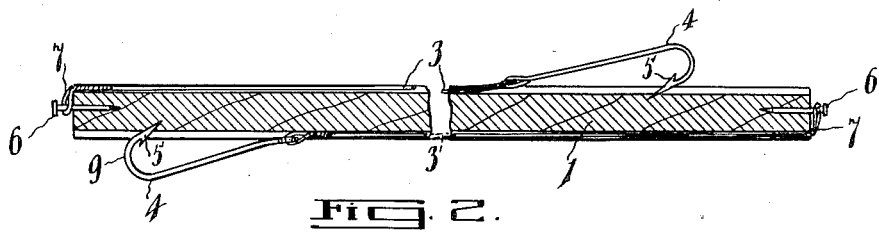
Fig. 2 is a section along the line 2—2 of Fig. 1 and shows fish hook and leader assemblies stored on both sides of the device.

Referring to the drawing, 1 is an elongated mounting block or slab comprised preferably of a soft material having a specific gravity substantially less than unity. Cedar wood is a very suitable substance. Soft pine wood has also proved satisfactory. Another very satisfactory material is basswood. The block 1 is machined to provide on at least one, and preferably both its major surfaces, a plurality of grooves 2 of sufficient width and depth to receive the leader 3 of an ordinary hook 4 and also the bill or barbed end 5 of the hook. The grooves are arranged along the longer dimension of the block and a short edge of the block supports a row of anchoring or hitching pins 6. These pins are preferably positioned under the bottom surface of the grooves, one for each groove on one face of the block. If grooves also exist as shown on the other face of the block, a similar set of hitching pins 6 is inserted in the opposite short edge of the block. Hook and leader assemblies are stored by hitching the eye 7 of a leader 3 over a pin 6, laying the leader in a corresponding groove 2 and jabbing the barbed hook 4 into the bottom of a groove 2 as shown at 9 in Figure 2. To remove a hook and leader assembly it is merely necessary to pull outwardly on a hook 4, and unhook the corresponding eye 7 from the corresponding pin 6.

Figure 1:
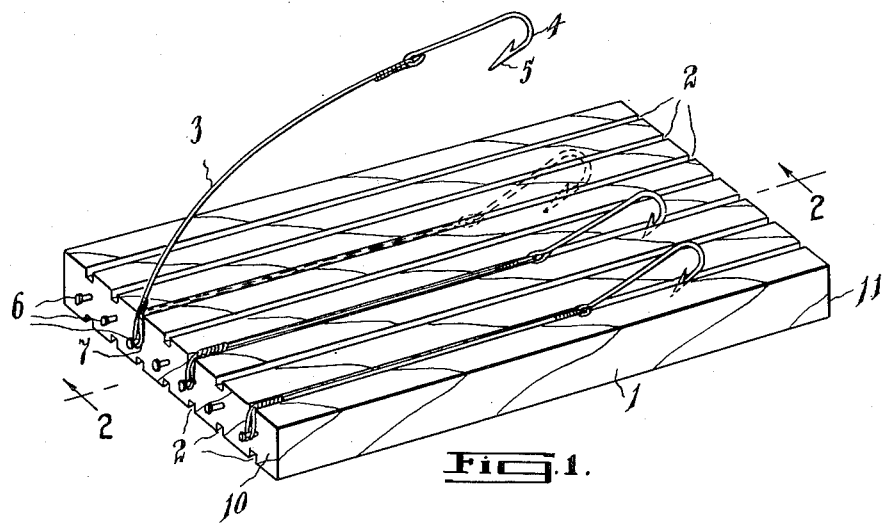
Fig. 1 is a perspective view of a fish hook and leader storage device constructed according to the invention.
Figure 3:
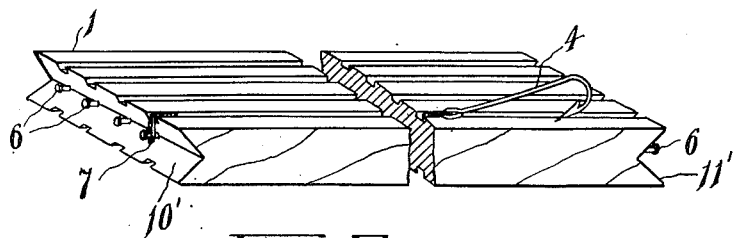
Fig. 3 depicts in perspective form a slight modification, wherein the ends of the mounting block include recessed anchoring pins.

Fig. 3 shows the construction of Fig. 1 with a modified feature. The ends or short edges are modified to a transverse V form 10′, 11′ providing at opposite ends a recess of such depth that the pins 6 do not protrude beyond the ends of the block 1. This has the advantage that the block can be stored in a fisherman's kit without the risk of pins 6 becoming caught on other gear in the kit. The modified block can also be carried in the cloth pocket of a coat without risk of tearing holes in the pocket.

A typical example of construction may have the following non-limiting dimensions. Length from 10 inches or long enough to accommodate the longest desired leader, width about 3 inches, thickness about one-half inch. Four grooves on each side may be 0.2 inch wide and 0.125 to 0.2 inch in depth. The pins 6 may be of the kind known in the hardware trade as $1/16$ inch x $3/4$ inch brass panel-pins. This arrangement will accommodate up to 8 leaders and hooks. Larger blocks containing more grooves could be readily made but when designed for more than 8 or 10 hook assemblies they tend to become unwieldy.

It is desirable, of course, to cover the block with a light coating of waterproof laquer or enamel, keeping only in mind that the completed mounting block 1 must be able to float when so "painted," that is, the paint must not be heavy enough to destroy its buoyancy.

The invention may be embodied in other specific forms without departing from the spirit thereof. The present embodiments are therefore to be regarded in all respects as illustrative and not restrictive, the scope of the invention being indicated by the wording of the appended claims.

What I claim is:

1. A holder for leaders and fish hooks having bills comprising a flat rectilinear block of buoyant material having opposite faces provided with parallel grooves, said grooves being located in pairs on the said opposite faces, a plurality of straight pins having heads adapted to retain a loop thereon, said pins extending outwardly from an end of said block and each pin being positioned as to be parallel with and in the same plane as a pair of grooves located on opposite faces of said block, and each said groove being supplied with a bottom face of resilient material capable of being penetrated by the bill of a hook.

2. A construction as defined in claim 1 in which an end of the block at which the straight pins reside is characterised by a recess of sufficient depth to include the total outward extension of each exposed portion of said straight pins.

3. A holder in accord with claim 1, in which an end of the block from which pins extend is supplied with a transverse recess of a V-shape in cross section, and in which the pins therein are disposed wholly within the confines of the recess.

References Cited in the file of this patent

UNITED STATES PATENTS

| | | |
|---|---|---|
| 1,076,898 | Madsen | Oct. 28, 1913 |
| 1,578,631 | Bolton | Mar. 30, 1926 |
| 2,597,304 | Dillingham | May 20, 1952 |
| 2,659,997 | Guestinger | Nov. 24, 1953 |